United States Patent Office 3,149,032
Patented Sept. 15, 1964

3,149,032
ANTI-CONVULSANT: N-ACYLANILINE DERIVATIVES
Wilson Shaw Waring, Macclesfield, England, assignor to Imperial Chemical Industries Limited, London, England, a corporation of Great Britain
No Drawing. Filed Nov. 14, 1960, Ser. No. 68,683
Claims priority, application Great Britain, Nov. 24, 1959, 39,906/59
5 Claims. (Cl. 167—55)

This invention relates to pharmaceutical compositions and more particularly it relates to pharmaceutical compositions which possess anti-convulsant activity and which are useful for the treatment of grand mal epilepsy in man.

According to the invention we provide pharmaceutical compositions for use in the treatment of epilepsy comprising as active ingredient at least one N-acylaniline derivative of the formula:

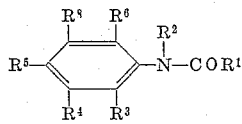

wherein $R^1$ stands for hydrogen, a lower alkyl radical, a $\beta$-chloroethyl radical or for a radical of the formula —$OR^7$ or —$N(R^7)_2$ wherein $R^7$ stands for a lower alkyl radical, wherein $R^2$ stands for hydrogen or a lower alkyl radical or for a radical of the formula —$COR^7$ wherein $R^7$ has the meaning stated above, wherein $R^3$ and $R^6$, which may be the same or different, stand for halogen atoms or for lower alkyl radicals, trifluoromethyl radicals or phenyl radicals, and wherein $R^4$, $R^5$ and $R^8$, which may be the same or different, stand for hydrogen or for halogen atoms or methyl, acetyl, nitro, amino or lower alkoxy radicals, in admixture with an inert, non-toxic, pharmaceutically-acceptable diluent or carrier.

It is to be understood that in the above definitions, the expression lower alkyl radical means an alkyl radical containing not more than 4 carbon atoms and the expression lower alkoxy radical means an alkoxy radical containing not more than 4 carbon atoms.

As suitable values of $R^1$ there may be mentioned, for example, the methyl, ethyl, n-propyl, isopropyl, n-butyl, sec-butyl, t-butyl, ethoxy, diethylamino or $\beta$-chloroethyl radical. As suitable values of $R^2$ there may be mentioned, for example, the methyl, ethyl, acetyl or propionyl radical. As suitable values of $R^3$ and $R^6$ there may be mentioned, for example, chlorine, bromine or iodine, or methyl, ethyl, propyl, t-butyl, trifluoromethyl or phenyl radicals. As suitable values of $R^4$, $R^5$ and $R^8$ there may be mentioned, for example, fluorine, chlorine, bromine or iodine or nitro, methyl, methoxy, acetyl or amino radicals. As particular values of $R^4$ there may be mentioned chlorine, bromine, methyl and acetyl radicals, as particular values of $R^5$ there may be mentioned fluorine, chlorine, bromine, iodine, nitro, amino, methyl and methoxy radicals and as particular values of $R^8$ there may be mentioned chlorine and bromine radicals.

As preferred active ingredients in the compositions of the invention there may be mentioned, for example, the known compounds,
2,4,6-tri-iodoacetanilide,
2,4,6-tribromoacetanilide,
2,4,6-tribromo-N-propionylaniline,
2,4,6-tribromo-N-n-butyrylaniline,
N-methyl-2,4,6-tribromoacetanilide,
2,4,6-tribromo-N,N-diacetylaniline,
2,6-dibromo-4-chloroacetanilide,
2-chloro-4,6-dibromoacetanilide,
2,6-dichloro-4-bromoacetanilide,
2,6-dibromo-4-nitroacetanilide,
2,4-dibromo-6-methylacetanilide,
2,4-dichloro-6-bromoacetanilide,
2,6-dimethyl-4-bromoacetanilide,
2,6-dibromo-4-methoxyacetanilide,
2,4,6-tribromo-3-methylacetanilide,
2,4,6-trichloroacetanilide,
2,4-dichloro-6-methylacetanilide,
2,6-dichloro-4-aminoacetanilide,
2,6-dichloroacetanilide,
2,3,5,6-tetrachloro-4-methoxyacetanilide,
2,4,6-trimethylformanilide,
2,4,6-trimethylacetanilide,
2,6-dimethylacetanilide
and 2-chloro-6-methylacetanilide
and the new compounds, N-propionyl-2,4,6-triiodoaniline, M.P. 257–258° C. (dec.);
N-n-butyryl-2,4,6-triiodoaniline, M.P. 232–234° C.;
N,N-diacetyl-2,4,6-triiodoaniline, M.P. 151–152° C.;
N,N-dipropionyl-2,4,6-triiodoaniline, M.P. 142–143° C.;
N-$\beta$-chloropropionyl-2,4,6-triiodoaniline, M.P. 237° C. (dec.);
N-methyl-2,4,6-triiodoacetanilide, M.P. 184–185° C.;
2-chloro-4,6-diiodoacetanilide, M.P. 234–235° C.;
3,6-dichloro-2,4-diiodoacetanilide, M.P. 245–246° C.;
3,4-dichloro-2,6-diiodoacetanilide, M.P. 259–260° C.;
6-bromo-2,4-diiodoacetanilide, M.P. 261–262° C.;
4-chloro-2,6-diiodoacetanilide, M.P. 237–238° C.;
2,6-dibromo-4-iodoacetanilide, M.P. 247–248° C.;
4-bromo-2,6-diiodoacetanilide, M.P. 248–249° C. (dec.);
3,4,6-trichloro-2-iodoacetanilide, M.P. 225–226° C.;
2,6-dichloro-4-iodoacetanilide, M.P. 215–216° C.;
2,3,5,6-tetrabromo-4-methoxyacetanilide, M.P. 279–280° C. (dec.);
2,6-dibromo-3,4-dichloroacetanilide, M.P. 216–217° C.;
2,4,6-tribromo-N - $\beta$ - chloropropionylaniline, M.P. 186–187° C.;
2,6-dibromo-4-fluoroacetanilide, M.P. 201–202° C.;
2,4-dibromo-3-chloro - 6 - methylacetanilide, M.P. 204–205° C.;
6-bromo-2,4,5-trichloroacetanilide, M.P. 195–196° C.;
2-bromo-4-chloro-6-trifluoromethyl - N - propionylaniline, M.P. 160–161° C.;
2,4,6-tribromo-3,5-dichloroacetanilide, M.P. 282–283° C.;
N,N-dipropionyl-2,4,6-tribromoaniline, M.P. 79–81° C.;
2,4,6-tribromo-N-ethylacetanilide, B.P. 161–163° C./0.2 mm.;
3-N,N-diacetylamino-2,4,6 - tribromoacetophenone, M.P. 115–116° C.;
3-acetylamino-2,4,6 - tribromoacetophenone, M.P. 178–180° C.;
2-bromo-4-chloro-6-trifluoromethylacetanilide, M.P. 178–179° C.;
2,4-dibromo-6-tertiarybutylacetanilide, M.P. 212° C.;
4,6-dibromo-2-phenylacetanilide, M.P. 163–164° C.;
4,6-dibromo-2,5-dichloroacetanilide, M.P. 199–201° C.;
2,4,6 - tribromo - N - pivalylaminobenzene, M.P. 174–175° C.;
2,4-dibromo-6-methylpropionylaminobenzene, M.P. 177–178° C.;
ethyl 2,4,6-tribromophenylcarbamate, M.P. 147–148° C.;
N-(2,4,6-tribromophenyl)-$N^1,N^1$-diethylurea, M.P. 156–158° C.;
4-bromo-2,6-dimethylformanilide, M.P. 220–221° C.;
pentachloroacetanilide, M.P. 245–246° C.;
and 2,4-dichloro-6-methylpropionylaminobenzene, M.P. 158–159° C.

Of the above-mentioned compounds to be used as active ingredients, particularly valuable compounds by virtue of anticonvulsant activity and lack of toxicity or undesirable side-effects are 2,4,6-triiodoacetanilide, 2,4,6-triiodo- N,N-diacetylaniline, 2,4,6 - triiodo - N-propionylaniline, 2,4,6-tribromo-N-propionylaniline and 2,4-dibromo-3,6-dichloroacetanilide and of these, the compound 2,4,6-triiodoacetanilide is preferred.

The said pharmaceutical compositions may be in a form suitable for oral use for example as tablets, aqueous or oily suspensions, dispersible powders or granules, emulsions, hard or soft capsules, or syrups or elixirs.

Compositions intended for oral use may be prepared according to any method known to the art for the manufacture of pharmaceutical compositions and such compositions may contain one or more agents selected from the group consisting of sweetening agents, flavoring agents, colouring agents and preserving agents in order to provide an elegant and palatable preparation.

The said tablets contain the active ingredient in admixture with non-toxic pharmaceutical excipients known to be suitable in the manufacture of tablets. Suitable pharmaceutical excipients may be for example, inert diluents, for example calcium carbonate, sodium carbonate, lactose, calcium phosphate or sodium phosphate, granulating and disintegrating agents, for example maize starch, or alginic acid, binding agents for example starch, gelatine or acacia and lubricating agents, for example magnesium stearate, stearic acid or talc. The tablets may be uncoated or they may be coated by known techniques to delay disintegration and absorption in the gastro-intestinal tract and thereby provide a sustained action over a longer period.

The said tablet compositions may be formulated so that for every 100 parts by weight of the composition there are present between 5 and 95 parts by weight of the active ingredient and preferably between 25 and 85 parts by weight of the active ingredient. The tablet compositions will generally contain between about 100 mg. and about 500 mg. of the active ingredient of the formula stated above.

The said aqueous suspensions contain the active ingredient in admixture with excipients known to be suitable in the manufacture of aqueous suspensions. Suitable excipients may be, for example suspending agents, for example sodium carboxymethylcellulose, methylcellulose, hydroxypropylmethylcellulose, sodium alginate, polyvinylpyrrolidone, gub tragacanth and gum acacia. Dispersing or wetting agents may be a naturally-occurring phosphatide, for example lecithin, or condensation products of ethylene oxide with fatty acids, for example polyoxyethylene stearate, or condensation products of ethylene oxide with long chain aliphatic alcohols, for example heptadeca-ethyleneoxy-cetanol, or condensation products of ethylene oxide with partial esters derived from fatty acids and a hexitol, for example polyoxyethylene sorbitol mono-oleate, or condensation products of ethylene oxide with partial esters derived from fatty acids and hexitol anhydrides, for example polyoxyethylene sorbitan mono-oleate. The said aqueous suspensions may also contain one or more preservatives for example ethyl or n-propyl p-hydroxybenzoate, one or more colouring agents, one or more flavouring agents and one or more sweetening agents such as sucrose, saccharin or sodium cyclamate.

Oily suspensions may be formulated by suspending the active ingredient in a vegetable oil, for example arachis oil, olive oil, sesame oil or coconut oil, or in a mineral oil such as liquid paraffin, and the said oily suspensions may contain a thickening agent, for example beeswax, hard paraffin or cetyl alcohol. Sweetening agents, for example icing sugar, sodium saccharin or sodium cyclamate, and flavouring agents, for example caramel, may be added to provide a palatable oral preparation. These compositions may be preserved by the addition of an anti-oxidant such as propyl gallate or ascorbic acid.

Dispersible powders and granules suitable for the extemporaneous preparation of an aqueous suspension by the addition of water contain the active ingredient in admixture with a dispersing or wetting agent, suspending agent and one or more preservatives. Suitable dispersing or wetting agents and suspending agents are those mentioned above in the description of aqueous suspension formulations. Additional excipients, for example sweetening, flavouring and colouring agents, may optionally also be present.

The pharmaceutical compositions of the invention may also be in the form of oil-in-water type emulsions. The oily phase may be a vegetable oil, for example olive oil or arachis oils, or a mineral oil for example liquid paraffin or mixtures of these. Suitable emulsifying agents may be naturally-occurring gums, for example gum acacia or gum tragacanth, naturally-occurring phosphatides, for example soya bean lecithin, and esters or partial esters derived from fatty acids and hexitol anhydrides, for example sorbitan mono-oleate, and condensation products of the said partial esters with ethylene oxide, for example polyoxyethylene sorbitan mono-oleate. The emulsions may optionally contain sweetening and flavouring agents.

Formulations for oral use may be presented as hard gelatine capsules wherein the active ingredient is mixed with an inert solid diluent, for example calcium carbonate, calcium phosphate or kaolin, or as soft gelatine capsules wherein the active ingredient is mixed with an oily medium, for example arachis oil, liquid paraffin or olive oil.

Syrups and elixirs may be formulated with sweetening agents, for example glycerol, sorbitol or sucrose. Such formulations may also contain a demulcent, a preservative and flavouring and colouring agents.

The pharmaceutical compositions may be in the form of a sterile injectable preparation for example as a sterile injectable aqueous suspension. This suspension may be formulated according to the known art using those suitable dispersing or wetting agents and suspending agents which have been mentioned above.

The sterile injectable preparation may also be a sterile injectable solution or suspension in a non-toxic parenterally-acceptable diluent or solvent for example as a solution in 1:3-butane diol.

The pharmaceutical compositions may also be in the form of suppositories intended for administration of the drug per rectum. These compositions can be prepared by mixing the drug with a suitable non-irritating excipient which is solid at ordinary temperatures but liquid at the rectal temperature and will therefore melt in the rectum to release the drug. Suitable such materials are cocoa butter and polyethylene glycols.

As indicated above, the pharmacetutical compositions with which this invention is concerned possess anticonvulsant properties. It is expected that these compositions will generally be administered in unit dosage form containing from about 100 mg. to about 500 mg. of active ingredient. The compositions will generally be administered to patients to provide a daily dose of from about 100 mg. to about 3 gm. of active ingredient and more particularly from about 300 mg. to 1 gm. of active ingredient. Preferred compositions for ease of administration are solid compositions for example tablet compositions containing between 100 mg. and 500 mg. of active ingredient.

The preferred compound 2,4,6-triiodoacetanilide is highly effective in preventing maximal seizures caused by electrical currents in rats and in mice. It is more active in rats than any of three well known anticonvulsant drugs, phenobarbitone, phenytoin and methoin. The compound also possesses remarkably low toxicity. In rats, single doses of 2 gm./kg. of body weight failed to kill any animal and caused no sedation. The compound has a therapeutic index of >150 to 300 in rats and an equally large safety margin between neurotoxic dose and equally large safety margin between neurotoxic dose and lethal dose. The latter safety margin is most unexpected and important in that known anticonvulsant drugs are in general characterised by a small safety margin in respect of neurotoxicity. In mice, the neurotoxic dose of the compound is approximately 160 times the active dose. The acute therapeutic index in mice i.e. the ratio of that dose which is lethal to 50% of the animals to that dose which is effective in preventing seizures in 50% of the animals, is of the order of 370 and thus the margin between lethal dose and active dose of the compound is outstanding. The above evidence indicates that the compound is a potent anticonvulsant which is remarkably free from deleterious side effects.

The active ingredient in the pharmaceutical compositions, as mentioned above, may be a new compound and those new compounds listed and characterised above form an additional feature of this invention.

According to a further feature of the invention we provide a process for the manufacture of the said new compounds which comprises the acylation of the corresponding aniline derivative.

As suitable acylating agents there may be mentioned, for example the corresponding acid, for example formic acid, acid halide or acid anhydride. The said acylation may be carried out in the presence of a diluent or solvent which may be, for example an excess of the acid used as acylating agent, or the acid corresponding to the acid halide or anhydride used as acylating agent or dimethylformamide, or benzene. The said acylation process may be accelerated or completed by the application of heat, or by the addition of a small quantity of concentrated sulphuric acid.

According to a further feature of the invention we provide a process for the manufacture of ethyl 2,4,6-tribromophenylcarbamate and N':N'-diethyl N-(2,4,6-tribromophenyl)urea which comprises reaction of 2,4,6-tribromophenyl isocyanate with ethanol or with diethylamine respectively.

The invention is illustrated but not limited by the following examples in which the parts are by weight. It is to be understood that the active ingredient used as starting material in Examples 1–6 can be replaced by any of the other known or novel compounds mentioned in the earlier part of the specification and there are likewise obtained pharmaceutical compositions suitable for the treatment of epilepsy.

*Example 1*

A mixture of 500 parts of 2,4,6-triiodoacetanilide and 50 parts of lactose is granulated with a sufficient quantity of water, and to this is added 200 parts of maize starch and the mass passed through a 16 mesh screen. The granules are dried in a current of air at a temperature not exceeding 65° C. The dry granules are passed through a 16 mesh screen, and mixed with 7.5 parts of magnesium stearate, and then compressed into tablets. There are thus obtained tablets suitable for oral administration for therapeutic purposes in the treatment of grand mal epilepsy in man.

The 500 parts of 2,4,6-triiodoacetanilide used as starting material may be replaced by 75 parts or 30 parts of 2,4,6-triiodoacetanilide and there are likewise obtained tablets suitable for oral administration for therapeutic purposes in the treatment of epilepsy.

The 2,4,6-triiodoacetanilide used as starting material may be obtained as follows:

A mixture of 99 parts of 2,4,6-triiodoaniline in 360 parts of dimethylformamide is heated under reflux until a clear solution is obtained. Heating is discontinued while 36 parts of acetyl chloride are added dropwise to the hot solution over about 5 minutes. After standing for 5 more minutes, 60 parts of water are added dropwise to the solution until crystals begin to form. The mixture is heated to boiling, left to cool and filtered, and the solid residue is washed with ethanol, and recrystallised from dimethylformamide or from β-ethoxyethanol. There is thus obtained 2,4,6-triiodoacetanilide as colourless needles, M.P. 276° C. (dec.).

The 2,4,6-triiodoacetanilide used as starting material in the preparation of the above tablets may be replaced by an equal quantity of 2,4,6 - triiodo-N,N-diacetylaniline, 2,4,6-triiodo-N-propionylaniline, 2,4,6-tribromo-N-propionylaniline, 2,4-dibromo-3,6-dichloroacetanilide. There are likewise obtained tablets which are suitable for oral administration for therapeutic purposes in the treatment of grand mal epilepsy in man.

*Example 2*

A mixture of 60 parts of 2,4,6-triiodoacetanilide, 3 parts of the calcium salt of lignin sulphonic acid, and 237 parts of water is ball-milled until the size of substantially all of the particles of 2,4,6-triiodoacetanilide is less than 10 microns. The suspension is diluted with a solution containing 3 parts of sodium carboxymethylcellulose and 0.9 part of the butyl ester of p-hydroxybenzoic acid in 300 parts of water. There is thus obtained an aqueous suspension suitable for oral administration for therapeutic purposes in the treatment of grand mal epilepsy in man.

*Example 3*

A mixture of 250 parts of 2,4,6-tribromoacetanilide, 202 parts of maize starch and 35 parts of alginic acid is mixed with a sufficient quantity of a 10% aqueous paste of maize starch, and granulated. The granules are dried in a current of warm air and the dry granules are then passed through a 16-mesh screen, mixed with 5 parts of magnesium stearate and compressed into tablet form. There are thus obtained tablets suitable for oral administration for therapeutic purposes in the treatment of grand mal epilepsy in man.

The 2,4,6-tribromoacetanilide used as starting material may be obtained as follows:

35 parts of acetylchloride are added dropwise during 15 minutes to a stirred solution of 102 parts of 2,4,6-tribromoaniline in 400 parts of glacial acetic acid maintained at 100° C. The mixture is heated for a further 5 minutes, and then cooled and filtered. The solid residue is crystallised from glacial acetic acid and there is thus obtained 2,4,6-tribromoacetanilide, M.P. 235–236° C.

*Example 4*

A mixture of 250 parts of 2,4-dichloro-6-methylacetanilide, 37 parts of maize starch and 10 parts of gum acacia is granulated with a sufficient quantity of water. The mass is passed through a 12 mesh screen and the granules are dried in a current of warm air. The dry granules are passed through a 16 mesh screen, mixed with 3 parts of magnesium stearate and compressed into tablet form. There are thus obtained tablets suitable for oral administration for therapeutic purposes in the treatment of grand mal epilepsy in man.

*Example 5*

A mixture of 40 parts of N-propionyl-2,4,6-tribromoaniline, 40 parts of sucrose, 0.5 part of a cetyl alcohol polyethylene oxide condensate, 1 part of polyvinyl pyrrolidone, 0.25 part of methyl p-hydroxybenzoate and 100 parts of water is ball-milled for several hours. After the incorporation of suitable colouring and flavouring agents, there is obtained an aqueous suspension suitable for oral administration for therapeutic purposes in the treatment of grand mal epilepsy in man.

*Example 6*

5 parts of 2,4,6-tribromoacetanilide in a finely divided form are mixed with 12 parts of powdered gum acacia, 0.8 part of powdered tragacanth and 0.4 part of elixir of saccharin, and the whole is mixed with 50 parts of arachis oil. The oily suspension is then mixed with 50 parts of water and there is thus obtained an emulsion suitable for oral administration in the treatment of grand mal epilepsy in man.

*Example 7*

1.5 parts of acetyl chloride are added to a solution of 3 parts of 2,4-dibromo-6-phenylaniline in 20 parts of glacial acetic acid at 100° C. and heating is continued for 30 minutes. The mixture is poured into water, the water is decanted from the precipitated oil and the residual oil is stirred with petroleum ether (B.P. 40–60° C.). The mixture is filtered and the solid residue is recrystallised from benzene. There is thus obtained 2,4-dibromo-6-phenylacetanilide, M.P. 163–165° C.

*Example 8*

1 part of acetyl chloride is added to a solution of 2 parts of 2,4,-dibromo-3,6-dichloroaniline in 20 parts of glacial acetic acid at 100° C., and heating is continued for 15 minutes. The mixture is poured into 100 parts of water, the mixture is filtered, and the solid residue is crystallised from benzene. There is thus obtained 2,4-dibromo-3,6-dichloroacetanilide, M.P. 199–201° C.

*Example 9*

A mixture of 2 parts of 2,4-dibromo-6-methylaniline and 2 parts of propionic anhydride is heated at 100° C. for 30 minutes. The mixture is poured into water, filtered, and the solid residue is washed with a small quantity of ethanol. The solid residue is crystallised from aqueous alcohol and there is thus obtained 2,4-dibromo-6-methyl-propionylaminobenzene, M.P. 177–178° C.

*Example 10*

0.7 part of acetyl chloride is added to a solution of 2.8 parts of 6-t-butyl-2,4-dibromoaniline in 10 parts of glacial acetic acid, and the mixture is heated at 100° C. for 15 minutes. The mixture is poured into water, cooled, filtered, and the solid residue is crystallised from aqueous alcohol. There is thus obtained 2,4-dibromo-6-t-butylacetanilide, M.P. 212° C.

The 2,4-dibromo-6-t-butylaniline used as starting material may be obtained as follows:

A solution of 3 parts of o-t-butylaniline in 80 parts of 4% w./w. hydrochloric acid is cooled to 8° C. and a solution of 6 parts of bromine in 40 parts of 10% w./w. potassium bromide solution is added while the temperature is allowed to rise to 14° C. The precipitated oil is extracted with diethyl ether, the extracts are washed with water, dried and the solvent is removed. The residual oil consists of 2,4-dibromo-6-t-butylaniline.

*Example 11*

0.3 part of concentrated sulphuric acid is added to a solution of 3 parts of 2,4,6-tribromoaniline in 50 parts of propionic anhydride and the mixture is heated at 100° C. for 1.5 hours. The mixture is cooled, poured onto ice, the mixture left at room temperature for 1 hour, and then filtered. The solid residue is crystallised from methanol and there is thus obtained N,N-dipropionyl-2,4,6-tribromoaniline, M.P. 79–81° C.

*Example 12*

A mixture of 4 parts of 4-bromo-2,6-dimethylaniline and 13 parts of formic acid (98% w./w.) is heated under reflux for 8 hours. The mixture is cooled, filtered and the solid residue is washed with water. The solid residue is crystallised from ethanol and there is thus obtained 4-bromo-2,6-dimethylformanilide, M.P. 220–221° C.

*Example 13*

24 parts of acetyl chloride are added to 12 parts of N-ethyl-2,4,6-tribromoaniline and the mixture is heated at 100° C. for 12 hours. Excess acetyl chloride is removed by distillation and the residue is dissolved in diethyl ether. The solution is washed with dilute sodium hydroxide solution, dried over sodium sulphate and the solvent is then removed. The residue is fractionally distilled under reduced pressure and there is thus obtained N - ethyl - 2,4,6 - tribromoacetanilide, B.P. 161–163° C./0.2 mm.

*Example 14*

A mixture of 3 parts of 2,4-dichloro-6-methylaniline, 1.5 parts of propionic anhydride and 0.1 part of concentrated sulphuric acid is heated at 100° C. for 1 hour. The mixture is cooled, poured into water and the mixture is filtered. The solid residue is washed with a very small quantity of methanol and then crystallised from methanol. There is thus obtained, 2,4-dichloro-6-methyl-N-propionylaniline, M.P. 158–159° C.

*Example 15*

3 parts of acetyl chloride are added to a hot solution of 3 parts of 3-amino-2,4,6-tribromoacetophenone in 20 parts of glacial acetic acid, and the mixture is heated at 100° C. for 40 minutes. The mixture is cooled, and then poured into water, and the mixture is made alkaline by the addition of sodium hydroxide solution. After standing for 1 hour, the mixture is acidified with hydrochloric acid and filtered. The solid residue is crystallised from ethanol and there is thus obtained 3-acetyl-2,4,6-tribromoacetanilide, M.P. 178–180° C.

*Example 16*

To a solution of 2 parts of 3-amino-2,4,6-tribromoacetophenone in 20 parts of acetic anhydride is added 1 part of concentrated sulphuric acid. After 4 hours the solution is poured into water, the mixture filtered and the solid residue crystallised from ethanol. There is thus obtained 3-acetyl - N,N - diacetyl - 2,4,6 - tribromoaniline, M.P. 115–116° C.

*Example 17*

2 parts of 2,4,6-tribromophenyl isocyanate are dissolved in 25 parts of hot ethanol, and the solution is allowed to cool to room temperature (22° C.). The mixture is filtered and the solid residue is crystallised from ethanol. There is thus obtained ethyl 2,4,6-tribromophenylcarbamate, M.P. 147–148° C.

The 2,4,6-tribromophenyl isocyanate used as starting material may be obtained as follows:

A solution of 16.5 parts of 2,4,6-tribromoaniline in 150 parts of dry ethyl acetate is added over a period of 1 hour to a saturated solution of phosgene in 50 parts of dry ethyl acetate at room temperature, while phosgene is passed through the solution. The solution is then heated under reflux for 3 hours while the passage of phosgene is continued. The ethyl acetate is then removed by distillation and the residue is extracted with hot dry carbon tetrachloride. The extract is filtered and the filtrate is evaporated. The solid residue is crystallised from petroleum-ether (B.P. 100–120° C.) and there is thus obtained 2,4,6 - tribromophenyl isocyanate, M.P. 91–92° C.

*Example 18*

A mixture of 2 parts of 2,4,6-tribromophenyl isocyanate and 3 parts of dry diethylamine is heated under reflux for 10 minutes, cooled, and filtered. The solid residue is crystallised from petroleum ether (B.P. 100–120° C.) and there is thus obtained $N^1,N^1$-diethyl-N-(2,4,6-tribromophenyl)urea, M.P. 156–158° C.

*Example 19*

2 parts of 2,4,6-tribromoaniline and 2 parts of pivalyl chloride are heated under reflux on a steam bath for 7 hours. The residue is boiled with water, cooled, filtered, and the solid residue crystallised from aqueous alcohol. There is thus obtained 2,4,6-tribromo-N-pivalyl aminobenzene, as colourless plates, M.P. 174–175° C.

*Example 20*

To a hot solution of 3 parts of pentachloroaniline in 100 parts of glacial acetic acid is added 3 parts of acetyl chloride, and the mixture is boiled under reflux for 5 minutes. The solution is cooled, filtered, and the solid residue is crystallised from glacial acetic acid. There is thus obtained 2,3,4,5,6-pentachloroacetanilide as colourless needles, M.P. 245–246° C.

*Example 21*

3 parts of acetyl chloride are added to a hot solution of 2,4,6-tribromo-3,5-dichloroaniline in glacial acetic acid and heating is continued for 5 minutes. The mixture is cooled and filtered, and the solid residue is crystallised from glacial acetic acid. There is thus obtained 2,4,6-tribromo-3,5-dichloroacetanilide as colourless needles, M.P. 282–283° C.

*Example 22*

6 parts of bromine are added to a solution of 5 parts of 4-chloro-6-trifluoromethylaniline in 50 parts of glacial acetic acid, and the mixture is heated on a steam bath for 2.5 hours. The mixture is poured into water, cooled to 0° C., and made alkaline by addition of sodium hydroxide solution. The mixture is extracted with ether, the extract dried over sodium sulphate and the solvent removed. The solid residue is washed with petroleum-ether (B.P. 40–60° C.), and crystallised from benzene. There is thus obtained 2-bromo-4-chloro-6-trifluoromethylacetanilide, as colourless needles M.P. 178–179° C.

*Example 23*

A mixture of 2 parts of 4-chloro-6-trifluoromethylaniline, 16 parts of propionic acid, and 2 parts of bromine is heated on a steam bath for 1 hour and then poured into 20 parts of 40% sodium hydroxide and 40 parts of ice. The mixture is extracted with ether, dried over sodium sulphate, and the solvent removed. The residual oil is stirred with petroleum ether (B.P. 60–80° C.) and filtered, and the solid residue is crystallised from benzene. There is thus obtained 2-bromo-4-chloro-6-trifluoromethyl-N-propionylaniline, M.P. 160–161° C.

*Example 24*

Two parts of acetyl chloride are added to a solution of 2.3 parts of 2,6-dibromo-4-fluoroaniline in 20 parts of glacial acetic acid at 100° C., and heating is continued for 30 minutes. The mixture is cooled, poured into water, filtered, and the solid residue crystallised from ethanol. There is thus obtained 2,6-dibromo-4-fluoroacetanilide as colourless prisms, M.P. 201–202° C.

*Example 25*

2 parts of acetyl chloride are added to a solution of 4 parts of 2,3,5,6-tetrabromo-4-methoxyaniline in 25 parts of glacial acetic acid at 100° C., and heating is continued for 20 minutes. The mixture is cooled, filtered, and the solid residue crystallised from glacial acetic acid. There is thus obtained 2,3,5,6-tetrabromo-4-methoxyacetanilide as colourless needles, M.P. 279–280° C. (dec.).

The 2,3,5,6-tetrabromo-4-methoxyaniline used as starting material may be obtained as follows:

To a cooled and stirred solution of 14.1 parts of 3,5-dibromo-4-methoxyaniline in 45 parts of glacial acetic acid is added dropwise a solution of 15 parts of bromine in 20 parts of glacial acetic acid. The mixture is then stirred and heated at 100° C. for 3 hours, cooled in ice, filtered, the solid residue of hydrobromide washed with ether, and then converted into the free base by stirring with ammonium hydroxide solution. The mixture is filtered, and the solid residue crystallised from ethanol. There is thus obtained 2,3,5,6-tetrabromo-4-methoxyaniline as colourless needles, M.P. 149–150° C.

*Example 26*

2 parts of acetyl chloride are added to a solution of 3 parts of 2,6-dibromo-3,4-dichloroaniline in 20 parts of glacial acetic acid at 100° C., and heating is continued for 15 minutes. The mixture is poured onto ice, filtered, and the solid residue crystallised from ethanol, giving 2,6-dibromo-3,4-dichloroacetanilide as colourless prisms, M.P. 216–217° C.

The 2,6-dibromo-3,4-dichloroaniline used as starting material may be obtained as follows:

A hot solution 16 parts of 3,4-dichloroaniline in 60 parts glacial acetic acid is added dropwise over a period of 10 minutes to a solution of 30 parts of bromine in 60 parts of glacial acetic acid. The temperature of the mixture is allowed to rise to 60° C. The mixture is cooled, filtered, the solid residue of hydrobromide washed with ether until white, and then stirred with ammonium hydroxide solution to liberate the free base. The mixture is filtered, and the solid residue crystallised from ethanol, giving 2,6-dibromo-3,4-dichloroaniline as colourless needles, M.P. 109–111° C.

*Example 27*

2 parts of acetyl chloride are added to a solution of 3 parts of 6-bromo-2,4,5-trichloroaniline in 15 parts of glacial acetic acid at 100° C., and heating continued for 10 minutes. The mixture is poured onto ice, filtered, and the solid residue crystallised from benzene or ethanol. There is thus obtained 6-bromo-2,4,5-trichloroacetanilide as colourless needles, M.P. 195–196° C.

The 6-bromo-2,4,5-trichloroaniline used as starting material may be obtained as follows:

A solution of 15 parts of bromine in 25 parts of glacial acetic acid is added dropwise over a period of 30 minutes to a solution of 20 parts of 2,4,5-trichloroaniline in 50 parts of glacial acetic acid at 100° C., and heating continued for 1.5 hours. The mixture is cooled, filtered, and the solid residue of hydrobromide stirred with ammonium hydroxide to liberate the free base. The mixture is filtered, and the solid residue crystallised from ethanol, giving 6-bromo-2,4,5-trichloroaniline as colourless needles, M.P. 94–95° C.

*Example 28*

2 parts of acetyl chloride are added to a solution of 3 parts of 2,4-dibromo-3-chloro-6-methylaniline in 20 parts of glacial acetic acid at 100° C., and heating continued for 10 minutes. The mixture is poured into water, filtered, and the solid residue crystallised from ethanol. There is thus obtained 2,4-dibromo-3-chloro-6-methylacetanilide as colourless needles, M.P. 204–205° C.

The 2,4-dibromo-3-chloro-6-methylaniline used as starting material may be obtained as follows:

30 parts of bromine were added dropwise over a period of 20 minutes to a stirred solution of 18 parts of 3-chloro-6-methylaniline hydrochloride, 6.6 parts of anhydrous sodium acetate in 60 parts of glacial acetic acid at 70–80° C., and heating continued for 1 hour. The mixture was cooled, filtered, and the solid residue of hydrobromide stirred with ammonium hydroxide solution to liberate the free base. The mixture is filtered, and the solid residue crystallised from petroleum-ether (B.P. 60–80° C.) giving 2,4-dibromo-3-chloro-6-methylaniline as colourless needles, M.P. 69–70° C.

*Example 29*

3 parts of 2,4,6-tribromoaniline and 1.3 parts of β-chloropropionyl chloride are heated at 125° C. for 10 minutes, the temperature then raised to 200° C., and the mixture cooled. The solid residue was crystallised from aqueous ethanol, and finally from petroleum ether (B.P. 100–120° C.). There is thus obtained N-chloropropionyl-2,4,6-tribromoaniline having M.P. 186–187° C.

*Example 30*

A mixture of 3 parts of 2,4,6-triiodoaniline, 20 parts of acetic anhydride, and 1 part of concentrated sulphuric acid is heated on a steam bath for 2 hours, poured into water, left at room temperature for 1 hour, and filtered. The solid residue is crystallised from ethanol, and there is thus obtained N,N-diacetyl-2,4,6-triiodoaniline as straw coloured prisms, M.P. 151–152° C.

*Example 31*

To a mixture of 3 parts of 2,4,6-triiodoaniline in 20 parts propionic anhydride is added 1 part of concentrated sulphuric acid, and after 30 minutes the mixture is filtered. The solid residue is crystallised from glacial acetic acid or from aqueous dimethylformamide, and there is thus obtained N-propionyl - 2,4,6 - triiodoaniline as colourless needles, M.P. 257–258° C. (dec.).

*Example 32*

A mixture of 3 parts of 2,4,6-triiodoaniline, 20 parts of propionic anhydride and 1 part of concentrated sulphuric acid is heated on a steam bath for 2 hours, poured into water, and after standing for 1 hour at room temperature, filtered. The solid residue is crystallised from ethanol, and there is thus obtained N,N-dipropionyl-2,4,6-triiodoaniline as straw-coloured prisms, M.P. 142–143° C.

*Example 33*

2 parts of n-butyryl chloride are added to a hot solution of 2,4,6-triiodoaniline in 25 parts of dimethylformamide, and after 5 minutes 10 parts of water are added, the mixture cooled, and filtered. The solid residue is crystallised from chloroform, and there is thus obtained N-n-butyryl-2,4,6-triiodoaniline as colourless plates, M.P. 232–234° C.

*Example 34*

3 parts of β-chloropropionyl chloride are added to a hot solution of 10 parts of 2,4,6-triiodoaniline in 75 parts of dimethylformamide, and after 5 minutes charcoal is added, and the mixture is boiled, filtered, and 75 parts of water added, and the mixture filtered. The solid residue is crystallised from ethanol or from glacial acetic acid. There is thus obtained N-chloropropionyl-2,4,6-triiodoaniline as small prisms, M.P. 237° C. (dec.).

*Example 35*

To a suspension of 6 parts of 2,4,6-triiodoacetanilide in 100 parts of boiling dry xylene are added 0.6 part of sodium metal in small pieces, and the mixture boiled under reflux for 1 hour. The mixture is cooled, 4 parts of methyl iodide are added, and the mixture boiled under reflux for 30 minutes, cooled, filtered, and the solvent removed by distillation. The residue was triturated with benzene, filtered, and the solid residue crystallised from a mixture of benzene and petroleum ether (B.P. 60–80° C.). There is thus obtained N-methyl-2,4,6-triiodoacetanilide as large square prisms, M.P. 184–185° C.

*Example 36*

3 parts of acetyl chloride are added to a hot solution of 6 parts of 2,6-dibromo-4-iodoaniline in 24 parts of dimethylformamide, and after 5 minutes 2 parts of water are added dropwise, the mixture reheated to boiling, cooled, and filtered. The solid residue is crystallised from glacial acetic acid, and there is thus obtained 2,6-dibromo-4-iodoacetanilide as colourless needles, M.P. 247–248° C.

The 2,6-dibromo-4-iodoaniline used as starting material may be obtained as follows:

9 parts of iodine monochloride dissolved in 50 parts of glacial acetic acid are added to a stirred solution of 13 parts of 2,6-dibromoaniline in 50 parts of glacial acetic acid at 45° C. over a period of 10 minutes. After 16 hours at room temperature, the mixture is filtered, and the solid residue washed with hot water, then with ethanol, and crystallised from glacial acetic acid. There is thus obtained 2,6-dibromo-4-iodoaniline as colourless needles, M.P. 146–147° C.

*Example 37*

4 parts of acetyl chloride are added to a hot solution of 12 parts of 4-bromo-2,6-diiodoaniline in 45 parts of dimethylformamide, and after 5 minutes 10 parts of water are added, the mixture cooled, and filtered. The solid residue is crystallised from glacial acetic acid and there is thus obtained 4-bromo-2,6-diiodoacetanilide as small needles, M.P. 248–249° (dec.).

The 4-bromo-2,6-diiodoaniline used as starting material may be obtained as follows:

18 parts of iodine monochloride dissolved in 100 parts of glacial acetic acid are added to a stirred solution of 8.6 parts of 4-bromoaniline in 60 parts of glacial acetic acid at room temperature. After 18 hours, the mixture is filtered, and the solid residue crystallised from glacial acetic acid. There is thus obtained 4-bromo-2,6-diiodoaniline as brown needles, M.P. 134–136° C.

*Example 38*

1 part of acetyl chloride is added to a hot solution of 2.4 parts of 4-chloro-2,6-diiodoaniline in 15 parts of glacial acetic acid, and after 5 minutes 2 parts of water are added, heated again to boiling, and allowed to cool and filtered. The solid residue was crystallised from ethyl acetate, and there is thus obtained 4-chloro-2,6-diiodoacetanilide as colourless needles, M.P. 237–238° C.

*Example 39*

2 parts of acetyl chloride are added to a hot solution of 4 parts of 2,6-dichloro-4-iodoaniline in glacial acetic acid, and after 5 minutes the mixture is cooled and filtered. The solid residue is crystallised from aqueous ethanol, and there is thus obtained 2,6-dichloro-4-diodoacetanilide as colourless needles, M.P. 215–216° C.

The 2,6-dichloro-4-iodoaniline used as starting material may be obtained as follows:

9 parts of iodine monochloride dissolved in 50 parts of glacial acetic acid are added over 10 minutes to a stirred solution of 7 parts of 2,6-dichloroaniline in 25 parts of glacial acetic acid at room temperature. After 16 hours, the mixture is filtered, and the solid residue washed with water, and crystallised from glacial acetic acid, giving 2,6-dichloro-4-iodoaniline as slightly purple needles, M.P. 98–99° C.

*Example 40*

2.5 parts of acetyl chloride are added to a hot solution of 6 parts of 2-bromo-4,6-diiodoaniline in 24 parts of dimethylformamide, and after 5 minutes 2 parts of water are added, and the mixture cooled and filtered. The solid residue is crystallised from glacial acetic acid, and there is thus obtained 2-bromo-4,6-diiodoacetanilide as straw-colored needles, M.P. 261–262° C.

The 2-bromo-4,6-diiodoaniline used as starting material may be obtained as follows:

18 parts of iodine monochloride dissolved in 100 parts of glacial acetic acid are added over 10 minutes to a stirred solution of 8.6 parts of o-bromoaniline in 50 parts of glacial acetic acid at room temperature. After 15 hours the mixture is filtered, the solid residue washed with ethanol and then warm water, and crystallised from glacial acetic acid. There is thus obtained 2-bromo-4,6-diiodoaniline as dark prisms, M.P. 161–162° C.

*Example 41*

2 parts of acetyl chloride are added to a hot solution of 6 parts of 2,4,5-trichloro-6-iodoaniline in 24 parts of glacial acetic acid, and after 5 minutes the mixture is cooled and filtered. The solid residue is crystallised from aqueous ethanol, and there is thus obtained 2,4,5-trichloro-6-iodoacetanilide as colourless needles, M.P. 225–226° C.

The 2,4,5-trichloro-6-iodoaniline used as starting material may be obtained as follows:

18 parts of iodine monochloride dissolved in 100 parts of glacial acetic acid are added over 10 minutes to a stirred solution of 18 parts of 2,4,5-trichloroaniline in 50 parts of glacial acetic acid at room temperature. After 16 hours the mixture is diluted with 20 parts of water and filtered. The solid residue is crystallised from ethanol, giving 2,4,5-trichloro-6-iodoaniline as straw-coloured needles, M.P. 75–76° C.

*Example 42*

2 parts of acetyl chloride are added to a hot solution of 3 parts of 3,4-dichloro-2,6-diiodoaniline in 20 parts of glacial acetic acid, and after 5 minutes the mixture is cooled and filtered. The solid residue is crystallised from ethanol, and there is thus obtained 3,4-dichloro-2,6-diiodoacetanilide as colourless plates, M.P. 259–260° C.

The 3,4-dichloro-2,6-diiodoaniline used as starting material may be obtained as follows:

18 parts of iodine monochloride dissolved in 100 parts of glacial acetic acid are added over 10 minutes to a stirred solution of 7.5 parts of 3,4-dichloroaniline in 60 parts of glacial acetic acid at room temperature. After 16 hours the mixture is filtered, the solid residue washed with ethanol and hot water, and crystallised from petroleum-ether (B.P. 60–80° C.). There is thus obtained 3,4-dichloro-2,6-diiodoaniline as cream-coloured needles, M.P. 120–121° C.

*Example 43*

3 parts of acetyl chloride are added to a hot solution of 4.9 parts of 2,5-dichloro-4,6-diiodoaniline in 20 parts of glacial acetic acid, and after 5 minutes the mixture is cooled and filtered. The solid residue is washed with ethanol and crystallised from glacial acetic acid. There is thus obtained 2,5-dichloro-4,6-diiodoacetanilide as cream-coloured needles, M.P. 245–246° C.

The 2,5-dichloro-4,6-diiodoaniline used as starting material may be obtained as follows:

18 parts of iodine monochloride dissolved in 100 parts of glacial acetic acid are added over 10 minutes to a stirred solution of 8 parts of 2,5-dichloroaniline in 50 parts of glacial acetic acid at room temperature. After 16 hours the mixture is filtered, the solid residue washed with water, dried, and crystallised from benzene or petroleum-ether (B.P. 60–80° C.). There is thus obtained 2,5-dichloro-4,6-diiodoaniline as pale yellow needles, M.P. 111–112° C.

*Example 44*

4 parts of acetyl chloride are added gradually to a hot solution of 2-chloro-4,6-diiodoaniline in 45 parts of glacial acetic acid, and after 5 minutes the mixture is cooled and filtered. The solid residue is washed with ethanol and crystallised from glacial acetic acid. There is thus obtained 2-chloro-4,6-diiodoacetanilide as grey needles, M.P. 234–235° C.

The 2-chloro-4,6-diiodoaniline used as starting material may be obtained as follows:

18 parts of iodine monochloride dissolved in 100 parts of glacial acetic acid are added over 10 minutes to a stirred solution of 6.5 parts of o-chloroaniline in 50 parts of glacial acetic acid at room temperature. After 16 hours, the mixture is filtered and the solid residue washed with water, and crystallised from ethanol. There is thus obtained 2-chloro-4,6-diiodoaniline as brown prisms, M.P. 126–127° C.

What I claim is:

1. A process for the treatment of epilepsy in man which comprises administering a compound of the formula:

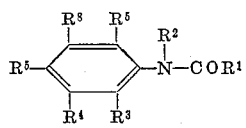

wherein $R^1$ is selected from the group consisting of hydrogen, lower alkyl, $\beta$-chloroethyl, —$OR^7$ and —$N(R^7)_2$ wherein $R^7$ stands for lower alkyl, wherein $R^2$ is selected from the group consisting of hydrogen, a lower alkyl, —$COR^7$ wherein $R^7$ has the meaning stated above, wherein $R^3$ and $R^6$ are selected from the group consisting of halogen, lower alkyl, trifluoromethyl and phenyl, and wherein $R^4$, $R^5$ and $R^8$ are selected from the group consisting of hydrogen, halogen, methyl, acetyl, nitro, amino and lower alkoxy, in admixture with an inert, non-toxic, pharmaceutically-acceptable vehicle, in a unit dosage form containing from about 100 mg. to about 500 mg. of said compound.

2. A process for the treatment of epilepsy in man according to claim 1 which comprises administering said compound in an amount sufficient to provide a daily dose of from about 100 mg. to about 3 gm. of said compound.

3. A process for the treatment of epilepsy in man according to claim 1 which comprises administering said compound in an amount sufficient to provide a daily dose of from about 300 mg. to about 1 gm. of said compound.

4. A pharmaceutical composition which is in a form suitable for oral use, said composition including, as the active ingredient, at least one N-acylaniline derivative of the formula:

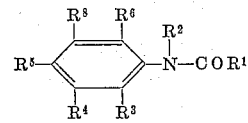

wherein $R^1$ is selected from the group consisting of hydrogen, lower alkyl, $\beta$-chloroethyl, —$OR^7$ and —$N(R^7)_2$ wherein $R^7$ stands for lower alkyl, wherein $R^2$ is selected from the group consisting of hydrogen, lower alkyl and —$COR^7$ wherein $R^7$ has the meaning stated above, wherein $R^3$ and $R^6$ are selected from the group consisting of halogen, lower alkyl, trifluoromethyl and phenyl, and wherein $R^4$, $R^5$ and $R^8$ are selected from the group consisting of hydrogen, halogen, methyl, acetyl, nitro, amino and lower alkoxy, in admixture with an inert, non-toxic, pharmaceutically-acceptable vehicle, said composition containing in unit dosage form between about 100 mg. and about 500 mg. of active ingredient.

5. A pharmaceutical composition which is in a form suitable for parenteral use, said component being at least one N-acylaniline derivative of the formula:

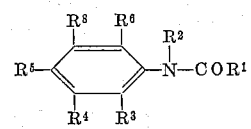

wherein $R^1$ is selected from the group consisting of hydrogen, lower alkyl, $\beta$-chloroethyl, —$OR^7$ and —$N(R^7)_2$ wherein $R^7$ stands for lower alkyl, wherein $R^2$ is selected from the group consisting of hydrogen, lower alkyl and —$COR^7$ wherein $R^7$ has the meaning stated above, wherein $R^3$ and $R^6$ are selected from the group consisting of halogen atom, lower alkyl, trifluoromethyl and phenyl, and wherein $R^4$, $R^5$ and $R^8$ are selected from the group consisting of hydrogen, halogen, methyl, acetyl, nitro, amino and lower alkoxy and said vehicle being selected from the group consisting of water and 1:3-butane diol.

References Cited in the file of this patent

UNITED STATES PATENTS

| | | |
|---|---|---|
| 2,175,371 | Zwilgmeyer | Oct. 10, 1939 |
| 2,357,912 | Seymour et al. | Sept. 12, 1944 |
| 2,744,852 | Goodman | May 8, 1956 |
| 2,775,539 | Stoughton | Dec. 25, 1956 |

OTHER REFERENCES

Chem. Abst. (1), 46; 3973(a).
Chem. Abst. (2), 45; 7034(e).
Chem. Abst. (3), 44; 3354(b).
Chem. Abst. (4), 44; 3354(b).
Chem. Abst. (5), 49; 1419(a).